(12) United States Patent  
Dorbie

(10) Patent No.: US 6,369,814 B1
(45) Date of Patent: Apr. 9, 2002

(54) TRANSFORMATION PIPELINE FOR COMPUTING DISTORTION CORRECTION GEOMETRY FOR ANY DESIGN EYE POINT, DISPLAY SURFACE GEOMETRY, AND PROJECTOR POSITION

(75) Inventor: Angus M. Dorbie, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/277,567

(22) Filed: Mar. 26, 1999

(51) Int. Cl.[7] .............................................. G06F 15/00
(52) U.S. Cl. ....................................................... 345/419
(58) Field of Search ................. 345/419, 421, 345/422, 426, 427, 428

(56) References Cited

U.S. PATENT DOCUMENTS 4,775,946 A * 10/1988 Anjyo ........................ 364/522

* cited by examiner

*Primary Examiner*—Phu K. Nguyen
(74) *Attorney, Agent, or Firm*—Woodcock Washburn LLP

(57) ABSTRACT

A transformation pipeline for computing distortion correction geometry for any design eye point, display surface geometry, and projector position. The present invention provides a method and system for automatically performing distortion correction to rendered images within an image generator in order to undo distortion induced by complex display systems (e.g., non-linear display surface geometry). For example, one embodiment of the present invention within an image generator automatically computes image distortion correction on-the-fly for any given geometry of a display surface, any given position of a design eye point, and any given position of a projector. Furthermore, the same embodiment also automatically computes image distortion correction on-the-fly whenever any of the above listed elements change. As such, an image projector implemented with an embodiment of the present invention presents images to the design eye point which are a geometrically accurate representation of the displayed world from the position of the viewer. It should be appreciated that an embodiment of software in accordance with the present invention pipelines particular transformation stages or steps in order to simplify support for different non-linear display surface geometries and projection systems.

21 Claims, 8 Drawing Sheets

TRANSFORMATION PIPELINE FOR COMPUTING DISTORTION CORRECTION GEOMETRY FOR ANY DESIGN EYE POINT, DISPLAY SURFACE GEOMETRY, AND PROJECTOR POSITION

TECHNICAL FIELD

The present invention relates to the field of displaying images and data. More specifically, the present invention relates to the field of distortion correction of images and data displayed on non-linear display surface geometry.

BACKGROUND ART

Currently, there is a wide variety of devices and techniques utilized to visually display analog and/or digital signals containing moving images, data, and the like, thereby enabling people to view this information. Many of these display devices are very familiar to the general public. For instance, moving images and data are visually displayed on television sets, computer monitors, and arcade video games, to name a few. It should be appreciated that there are many different technologies which are utilized to implement these type of display devices. Some of these technologies include a cathode ray tube (CRT), a liquid crystal display (LCD), a laser based system, a reflective LCD, and a plasma display.

Furthermore, there are other types of display systems that display moving images and data on a non-linear display surface geometry (e.g., a dome hemisphere display surface). It is appreciated that the non-linear display surface geometry can be implemented so that it is large enough to be viewed by several hundred people or small enough to be viewed by a single person. These types of display systems are typically used for visual simulation and immersive displays. But there are problems associated with implementing these types of display systems.

One of the main problems is that some sort of distortion correction is typically needed in order for the image projected onto a non-linear display surface geometry to appear correct to a viewer. One prior art solution for providing distortion correction to a projection or display system first involves projecting a test pattern image from a video projector onto an actual non-linear display surface geometry. Next, a person physically manipulates controls of the video projector in order to bend the projected test pattern until it looks correct. Furthermore, this manipulation could also be performed until the test pattern aligns with some physical points on the non-linear display surface geometry. Once the projected test pattern looks correct, analog and/or digital signals containing moving images and data are transmitted to the video projector in order to project them onto the non-linear display surface geometry to be seen by a viewer. It should be appreciated that there are several disadvantages to this prior art solution.

One of the main disadvantages of this prior art solution is that it is typically limited in its ability to make the projected images appear correct to the viewer. For example, the controls of the projector may not have the capability to provide enough distortion correction to the projected test pattern in order to make it appear correct. As such, the images projected from the projector onto the non-linear display surface geometry will not appear correct to the viewer thereby degrading the overall viewing experience of the viewer. Furthermore, another disadvantage of this prior art solution is that its implementation does not always provide very accurate distortion correction.

Another prior art solution for providing distortion correction to a display or projection system is to specifically design and build an image projection system for a specific non-linear display surface geometry. Furthermore, another prior art solution is to specifically design and build special video hardware to be implemented within an image generator that warps an image for a specific non-linear display surface geometry. But there are disadvantages associated with these prior art solutions. One of the main disadvantages is that either prior art solution is typically expensive. For instance, since non-linear display surface geometry can be very complicated, there is a lot of overhead in designing and building an image projection system or special video hardware specifically to operate in conjunction with a specific non-linear display surface geometry. Furthermore, for almost every different type of non-linear display surface geometry, a new image projection system or new special video mapping has to be designed and built basically from scratch. As such, these prior art solutions are not very cost efficient because neither provides any type of standardization, except by constraining the available display options.

Another disadvantage of these design and build prior art solutions is that the resulting image projection system or special video hardware is specifically limited to operate in conjunction with its designed non-linear display surface geometry (e.g., dome hemisphere). Therefore, if there is a need for an image projection system or special video hardware that properly operates with a different type of non-linear display surface geometry (e.g., cylindrical or conical), the existing image projection system or special video hardware is unable to be used for the desired purpose.

An additional disadvantage of all of the prior art solutions is that they tend to be static. In other words, one cannot use a dynamically changing display configuration (e.g., head tracked projector or target projector).

Accordingly, a need exists for a method and system for providing distortion correction to a projection or display system that enables it to project an image onto a non-linear display surface geometry which appears correct to a viewer. A further need exists for a method and system which meets the above need but is not very expensive. Still another need exists for a method and system which meets the above need and provides a standard for distortion correction. Yet another need exists for a method and system which meets the above need and is not specifically limited to one non-linear display surface geometry. A further need exists for a method and system which meets the above need and provides very accurate distortion correction. Another need exists for a method and system which meets the above need and also provides dynamic distortion correction which varies over time.

DISCLOSURE OF THE INVENTION

The present invention provides a method and system for automatically performing distortion correction to rendered images within an image generator in order to undo distortion induced by complex display systems (e.g., non-linear display surface geometry). For example, one embodiment of the present invention within an image generator automatically computes image distortion correction on-the-fly for any given geometry of a display surface, any given position of a design eye point, and any given position of a projector. Furthermore, the same embodiment also automatically computes image distortion correction on-the-fly whenever any of the above listed elements change. As such, an image projector implemented with an embodiment of the present invention presents images to the design eye point which are a geometrically accurate representation of the displayed world from the position of the viewer. It should be appreciated that an embodiment of software in accordance with the present invention pipelines particular transformation stages or steps in order to simplify support for different non-linear display surface geometries and projection systems.

Specifically, one embodiment of the present invention includes a method of automatically performing image distortion correction based on a non-linear display surface, a design eye point, and an image projector position. The method includes the computer-implemented step of rendering an image. Moreover, the method also includes the computer-implemented step of generating a vector from the design eye point to a point of the image. Furthermore, the method also includes the computer-implemented step of orienting the vector with respect to the non-linear display surface. Additionally, the method also includes the computer-implemented step of ray casting the vector onto the non-linear display surface from the design eye point to produce a three dimensional point on the non-linear display surface. Moreover, the method also includes the computer-implemented step of back projecting the three dimensional point onto a display plane of the image projector position to produce a two dimensional point on the display plane. The method also includes the computer-implemented step of mapping the image to the display plane.

In another embodiment, the present invention includes the computer-implemented steps of the above described embodiment and further includes the computer-implemented step of generating a texture coordinate which correlates to the point of said image. The above described embodiment is more specific wherein said step of mapping said image to said display plane further comprises the computer-implemented step of using the two dimensional point on the display plane and the texture coordinate to map the image to the display plane.

In still another embodiment, the present invention includes another method of automatically performing image distortion correction based on a non-linear display surface, a design eye point, and an image projector position. The method includes the computer-implemented step of rendering an image. Furthermore, the method also includes the computer-implemented step of generating a vector from a point of an image projector space. Another computer-implemented step of the method includes orienting the vector with the orientation of an image projector. Additionally, the method includes the computer-implemented step of ray casting the vector onto the non-linear display surface from an image projector position to produce a three dimensional point on the non-linear display surface. Moreover, the method includes the computer-implemented step of back projecting the three dimensional point onto an image plane of a design eye point to produce a two dimensional point. Furthermore, the method includes the computer-implemented step of mapping the image to a design display plane.

In another embodiment, the present invention includes the computer-implemented steps of the embodiment described directly above and further includes the computer-implemented step of generating a texture coordinate which correlates to the point. The above described embodiment is more specific wherein the step of mapping the image to the design display plane further comprises the computer-implemented step of using the point and the texture coordinate to map the image to the design display plane.

These and other advantages of the present invention will no doubt become obvious to those of ordinary skill in the art after having read the following detailed description of the preferred embodiments which are illustrated in the drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
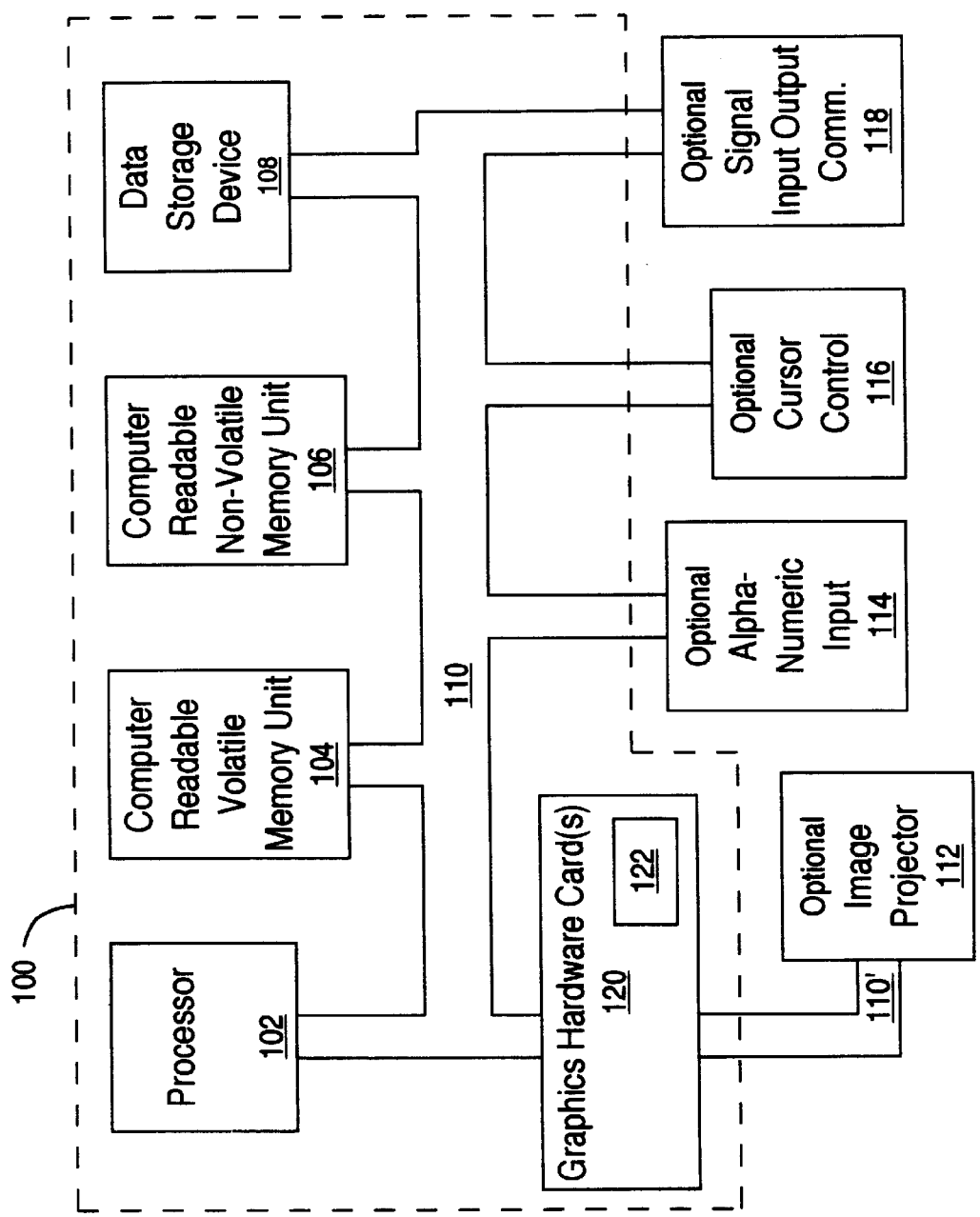
FIG. 1 is a block diagram of a computer system used in accordance with the present invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detail description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "rendering" or "generating" or "orienting" or "ray casting" or "back projecting" or "mapping" or "using" or "compensating" or "reducing" or "performing" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

The present invention provides a method and system for automatically performing distortion correction to rendered images within an image generator in order to undo distortion induced by complex display systems (e.g., non-linear display surface geometry). For example, one embodiment of the present invention within an image generator automatically computes image distortion correction on-the-fly for any given geometry of a display surface, any given position of a design eye point, and any given position of a projector. Furthermore, the same embodiment also automatically computes image distortion correction on-the-fly whenever any of the above listed elements change. As such, an image projector implemented with an embodiment of the present invention presents images to the design eye point which are a geometrically accurate representation of the displayed world from the position of the viewer. It should be appreciated that an embodiment of software in accordance with the present invention pipelines particular transformation stages or steps in order to simplify support for different non-linear display surface geometries and projection systems.

Now referring to FIG. 1, which is a block diagram of a computer system 100 used in accordance with one embodiment of the present invention. Within the following discussions of the present invention, certain processes and steps are discussed that are realized, in one embodiment, as a series of instructions (e.g., software program) that reside within computer readable memory units of computer system 100 and executed by processors of computer system 100. When executed, the instructions cause computer system 100 to perform specific actions and exhibit specific behavior which is described in detail below.

In general, computer system 100 of FIG. 1 used by an embodiment of the present invention comprises an address/data bus 110 for communicating information, one or more central processors 102 coupled with bus 110 for processing information and instructions, a computer readable volatile memory unit 104 (e.g., random access memory, static RAM, dynamic RAM, etc.) coupled with bus 110 for storing information and instructions (e.g., graphics software) for central processor(s) 102, a computer readable non-volatile memory unit 106 (e.g., read only memory, programmable ROM, flash memory, EPROM, EEPROM, etc.) coupled with bus 110 for storing static information and instructions for processor(s) 102. Computer system 100 also includes a mass storage computer readable data storage device 108 such as a magnetic or optical disk and disk drive (e.g., hard drive or floppy diskette) coupled with bus 110 for storing information and instructions. Optionally, computer system 100 can include an alphanumeric input device 114 including alphanumeric and function keys coupled to bus 110 for communicating information and command selections to central processor(s) 102, a cursor control device 116 coupled to bus 110 for communicating user input information and command selections to central processor(s) 102, a signal generating device 118 coupled to bus 110 for communicating command selections to processor(s) 102, and an image projector 112 coupled to bus 110 for displaying information (e.g., graphics primitives) to a viewer. Image projector 112 utilized with computer system 100 of the present invention can be implemented as an electron beam scanning device, a cathode ray tube (CRT), a liquid crystal display (LCD), a plasma display, a laser based system, or any other image projector suitable for creating graphic images and alphanumeric characters recognizable to the user.

Computer system 100 of FIG. 1 also provides data and control signals via bus 110 to a graphics hardware unit ("card") 120. The graphics hardware card 120 typically contains a display processor 122 and other specialized hardware units for processing a series of display instructions found within a memory stored display list to render graphics primitives. The display processor 122 supplies data and control signals to a frame buffer (not shown) which refreshes the image projector 112 for rendering images (including graphics images). The graphics hardware card 120 is coupled to the image projector 112 by an address/data bus 110', which enables them to communicate information or analog video connection.

Figure 2A:
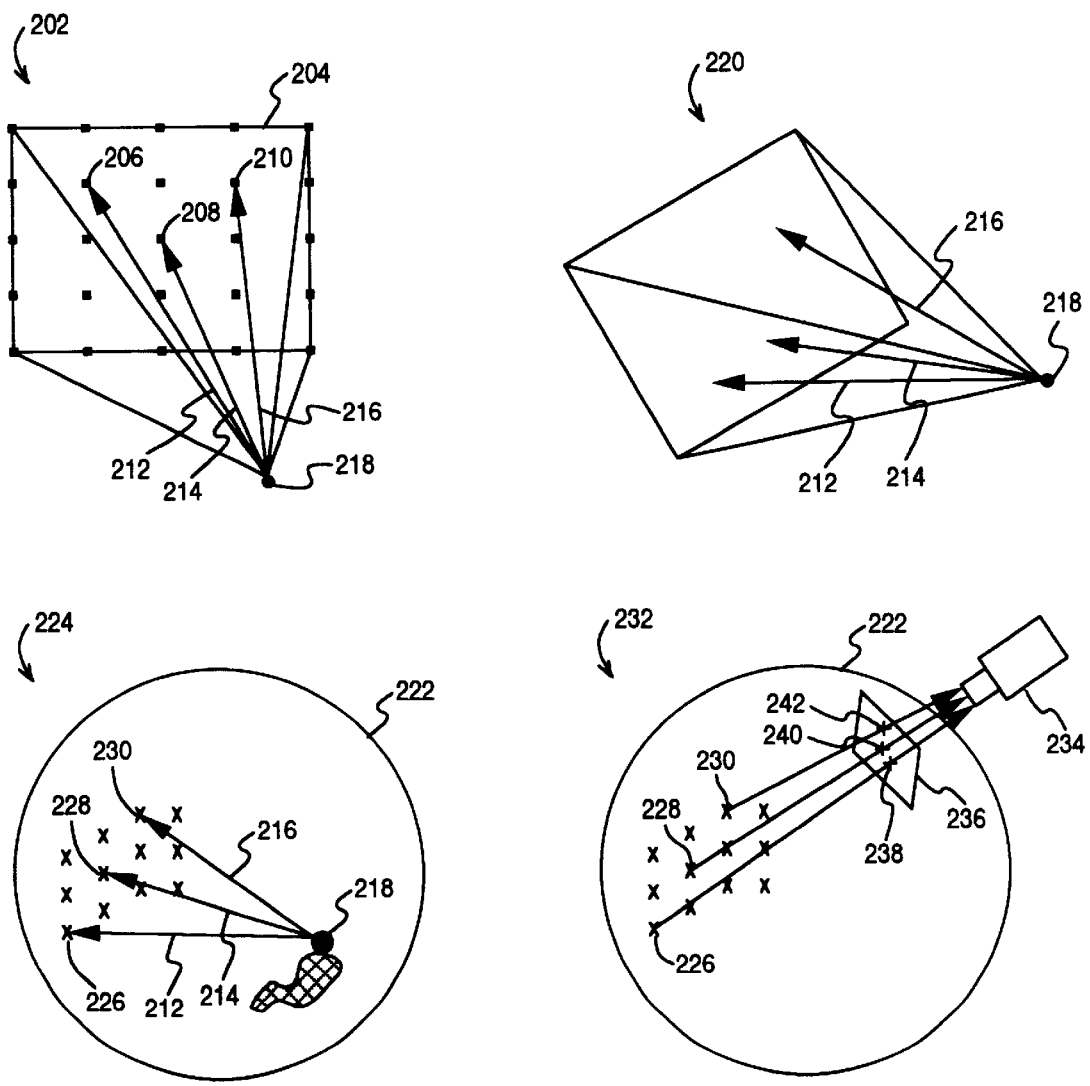
FIGS. 2A–2C illustrate one embodiment of distortion correction transformation stages that are performed automatically by an image generator under the direction of geometry transformation pipeline software, in accordance with the present invention.
Figure 2B:
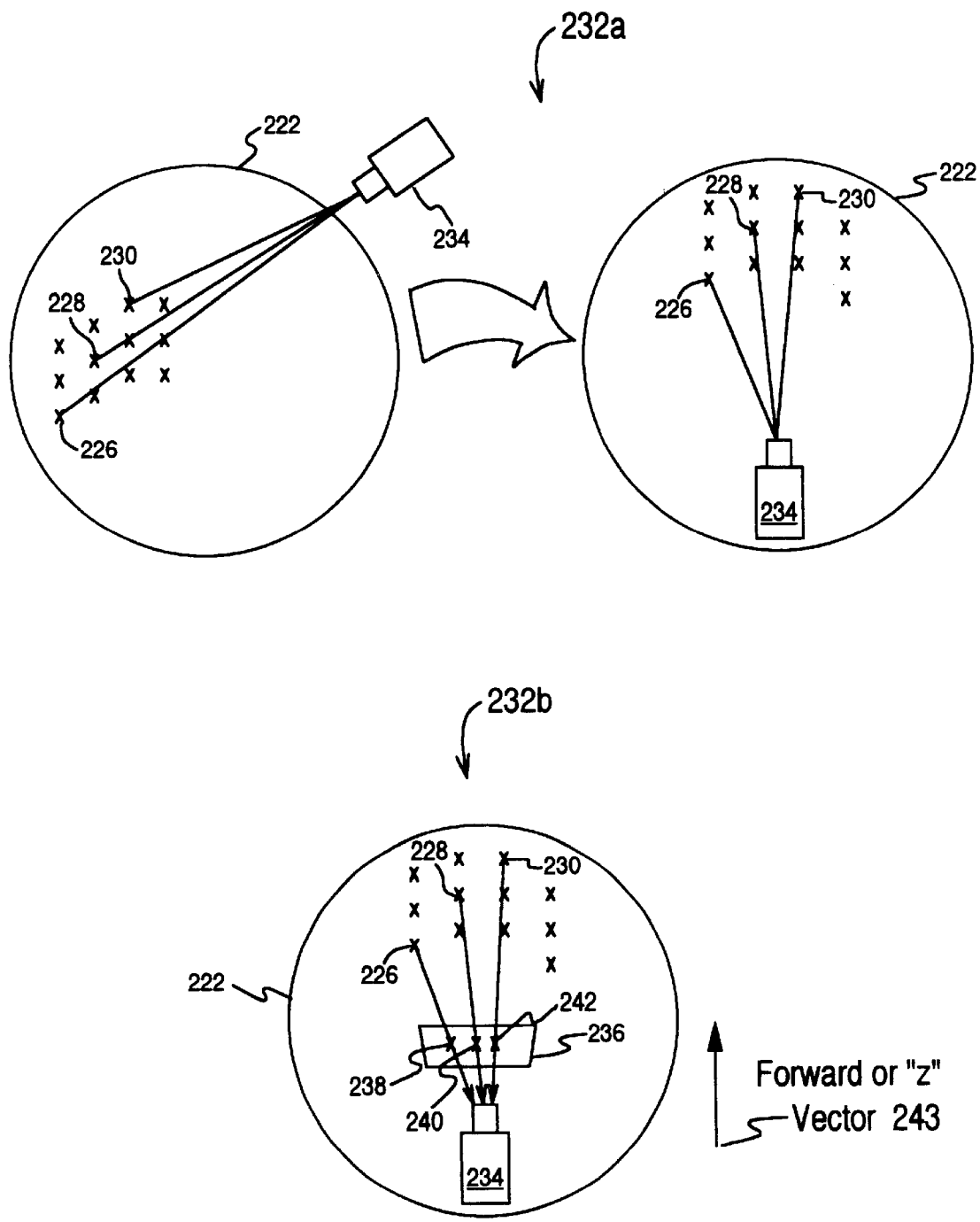
Figure 2C:
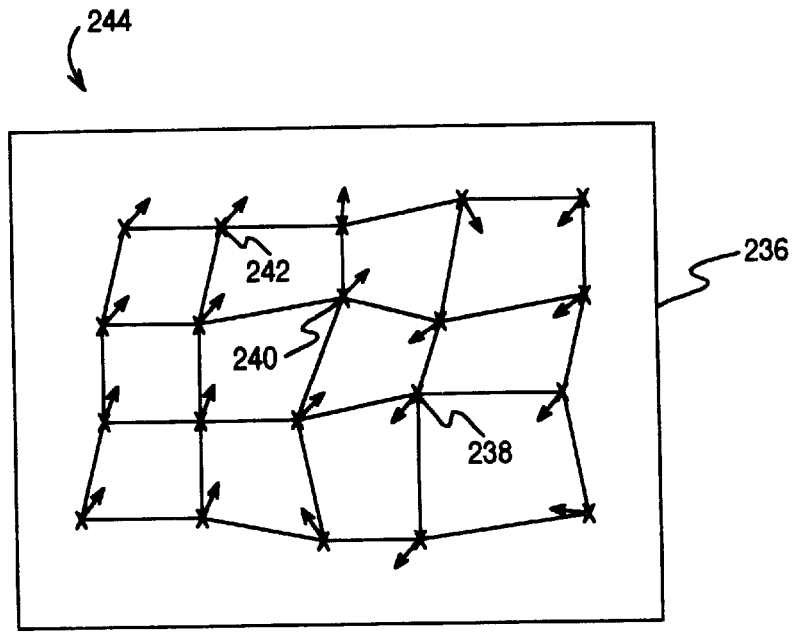
Figure 2C:
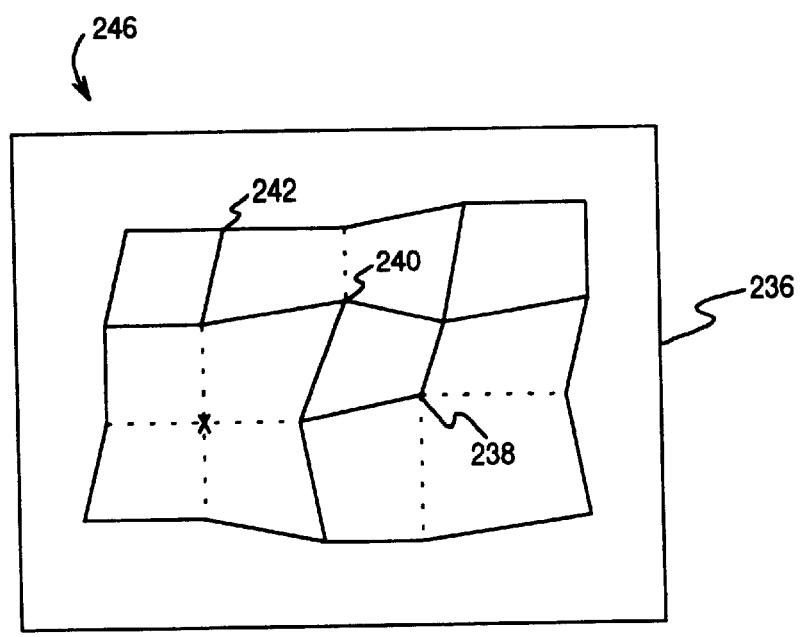

With reference now to FIGS. 2A–2C, which are diagrams illustrating one embodiment of distortion correction transformation stages that are performed automatically by an image generator under the direction of geometry transformation pipeline software, in accordance with the present invention. The software pipelines these distortion correction transformation stages in order to simplify support for different non-linear display surface geometries and projection systems. It should be appreciated that the geometry transformation pipeline software of the present embodiment computes a non-linear image mapping for a previously rendered image in order to correctly presented the image to a viewer on a non-linear display surface geometry. Basically, the present embodiment performs an image mapping from texture coordinates (s, t) of the rendered image to a distortion function (x, y) of a non-linear display surface geometry. It should be further appreciated that the present embodiment operates on computer system 100 in order to perform the distortion correction transformation stages automatically on-the-fly.

Before the present embodiment begins performing transformation stage 202 of FIG. 2A, an image 204 is previously rendered in a manner known by those of ordinary skill in the art. During transformation stage 202, a number of representative points (e.g., 206–210) or vertices are chosen within rendered image 204, thereby dividing rendered image 204 into a grid of points. It should be appreciated that the present embodiment is well adapted to divide rendered image 204 into a variety of ways. Once the representative points (e.g., 206–210) are chosen within rendered image 204, a vector (e.g., 212) is computed to each representative point (e.g., 206) from a design eye point 218 in the direction of the rendered channel. In other words, an array of vectors (e.g., 212–216) are generated through the vertices (e.g., points 206–210) of a discretised projection frustum. Furthermore, it should be appreciated that for each vector, a linearly correlated texture coordinate (s, t) is also generated by the present embodiment. Moreover, these vectors represent rays from design eye point 218 in the direction of the rendered channel.

During transformation stage 220, the vectors (e.g., 212–216) are then transformed through the viewing orientation of the channel with respect to the nominal forward vector of a parameterized non-linear display surface geometry 222 to orient them correctly with respect to the parameterized non-linear display surface geometry 222, which in the present embodiment is a parameterized spherical dome surface. It should be appreciated that the present embodiment is well equipped to handle any parameterized non-linear display surface geometry and is not limited in any way to a parameterized spherical dome display surface.

Still referring to FIG. 2A, during transformation stage 224, the oriented vectors (e.g., 212–216) of transformation stage 220 are then ray cast from design eye point 218 onto parameterized spherical dome display surface 222. In this manner, three dimensional points (e.g., 226–230) are produced on parameterized spherical dome display surface 222. In other words, during transformation stage 224, the ray casting process is a determination of the intersection of each ray cast vector (e.g., 212) with parameterized spherical dome display surface 222. As such, the present embodiment resolves the equations of the ray cast vectors (e.g., 212–216) and parameterized spherical dome display surface 222, resulting in three dimensional points (e.g., 226–230) on the surface of parameterized spherical dome display surface 222. It is appreciated that ray casting is well known by those of ordinary skill in the art.

During transformation stage 232, for each of the three dimensional points (e.g., 226–230) on the surface of parameterized spherical dome display surface 222 of transformation stage 224, it is desirable for the present embodiment to determine where to position them on a display plane of projection 236 of an image projector 234. In other words, if a video image is presented to projection system 234, it is important to determine where each of the three dimensional points (e.g., 226–230) is to be positioned on display plane 236. As shown in transformation stage 232a of FIG. 2B, the three dimensional points (e.g., 226–230) on the surface of parameterized spherical dome display surface 222 are transformed into the "projector" space by transforming them through the projector 234 orientation and positional offset. As shown in transformation stage 232a of FIG. 2B, the present embodiment back projects the three dimensional points (e.g., 226–230) onto display plane 236 of image projector 234 in order to produce two dimensional coordinate points (e.g., 238–242) in display plane 236. Each two dimensional coordinate (x, y) is then used with its corresponding texture coordinate (s, t) determined during transformation stage 202 to map computer generated image 204 to the display plane 236 of the projection system 234. Therefore, a non-linear image mapping is created in order to provide distortion correction for image 204. It is appreciated that the process of back projecting during transformation stage 232 involves division by the "forward" or "z" vector 243 of image projector 234 after transformation to projector space, which is specific for one type of projector lens. It should be appreciated that the present embodiment is well suited to be implemented with any type of projector lens (e.g., a fish-eye lens) by modifying the projection in transformation stage 232b.

With reference now to FIG. 2C, during transformation stage 244, a two dimensional mapping of this image is then applied to compensate for any distortions or inaccuracies in the display system. In other words, the present embodiment performs an alignment process in order to fine tune the mesh of the non-linear image map. During transformation stage 246, a mesh complexity reduction is then applied by the present embodiment in order to limit the number of polygons needed for the remapping of the display. In other words, the present embodiment performs an optimization which drops vertices in order to simplify the mesh. It should be appreciated that if something within the mesh is linear or near linear, it can be approximated with fewer points than if it is highly non-linear. That is, if something is non-linear, a lot more vertices are used to approximate it compared to something which is linear. Once the non-linear image mapping is created by the present embodiment, it is then used by the image generator to manipulate images in order to correctly project them onto the actual physical spherical dome display surface. It should be appreciated that the present embodiment is able to dynamically adapt the non-linear image mapping to any changes in the shape of the parameterized display surface geometry, the position of the design eye point, and the position of the image projector. Therefore, if any of these parameters change, the present embodiment automatically re-performs the distortion correction transformation stages described above on-the-fly in order to determine a new non-linear image mapping.

It should be appreciated that an additional transformation stage could exist between transformation stages 202 and 220 which is similar to transformation stage 244. During the additional transformation stage, a two dimensional image warping operation is applied to make the final adjustment needed for final alignment to parameterized spherical dome display surface 222.

Figure 3A:
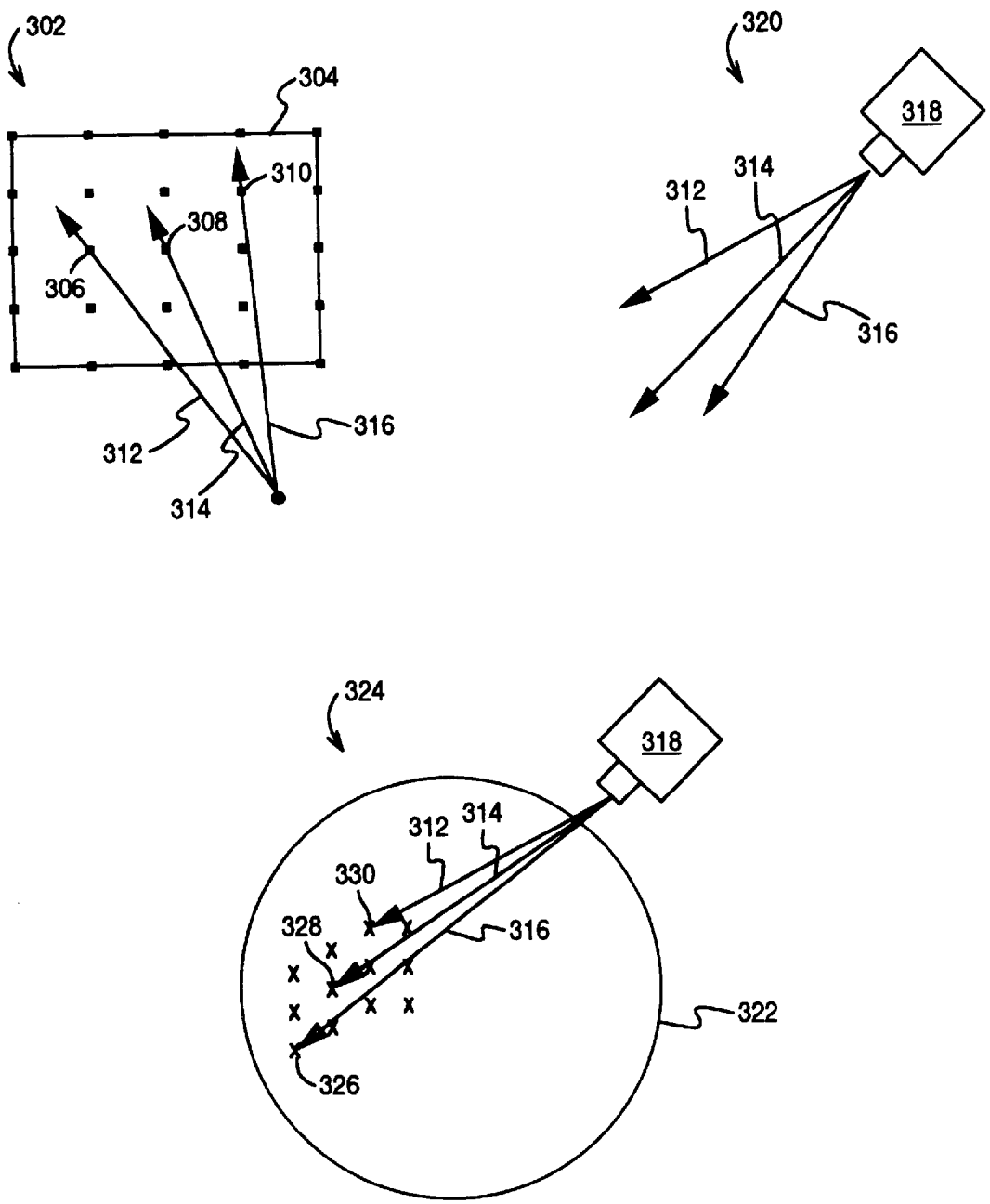
FIGS. 3A–3C illustrate another embodiment of distortion correction transformation stages that are performed automatically by an image generator under the direction of geometry transformation pipeline software, in accordance with the present invention.
Figure 3B:
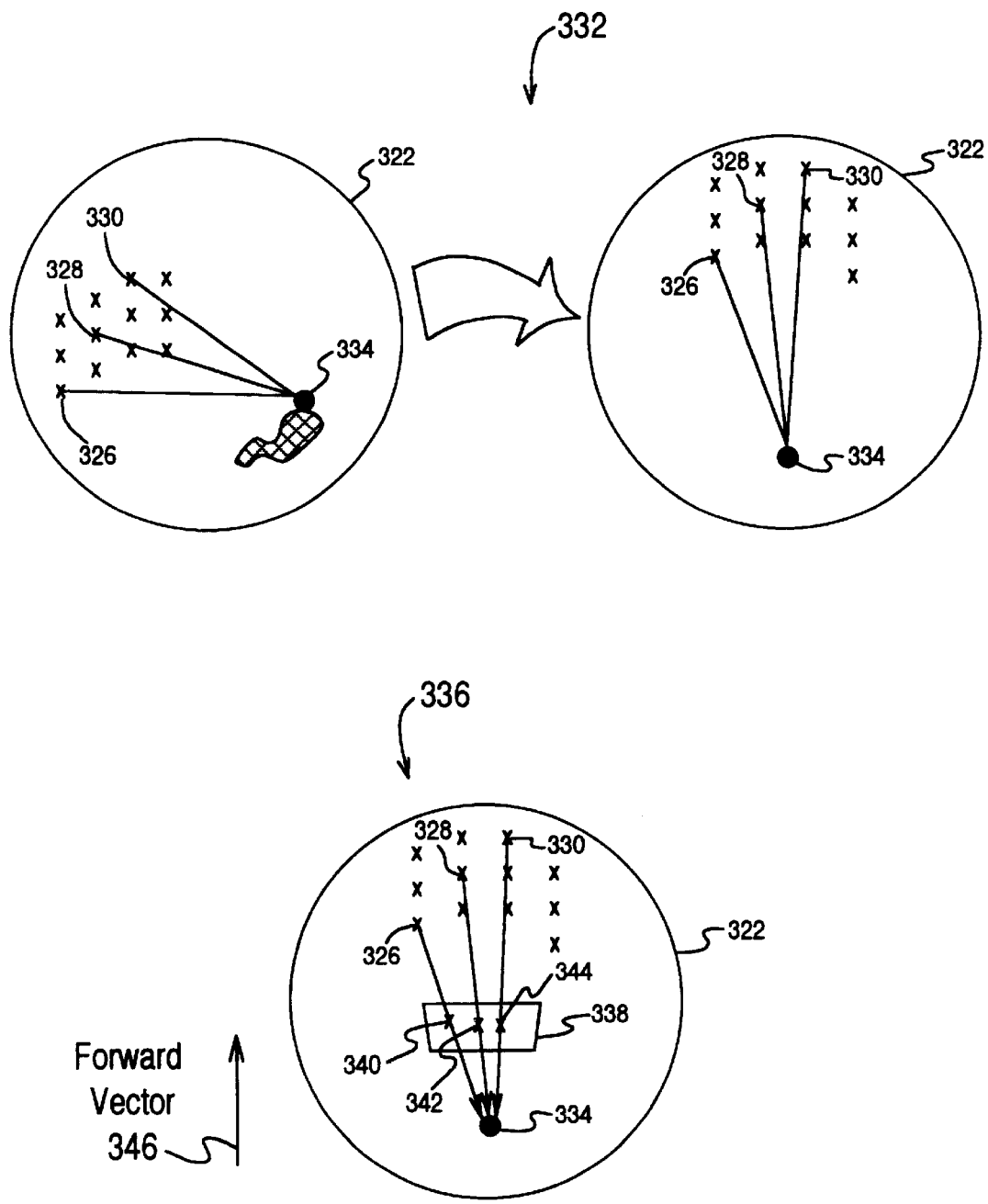
Figure 3C:
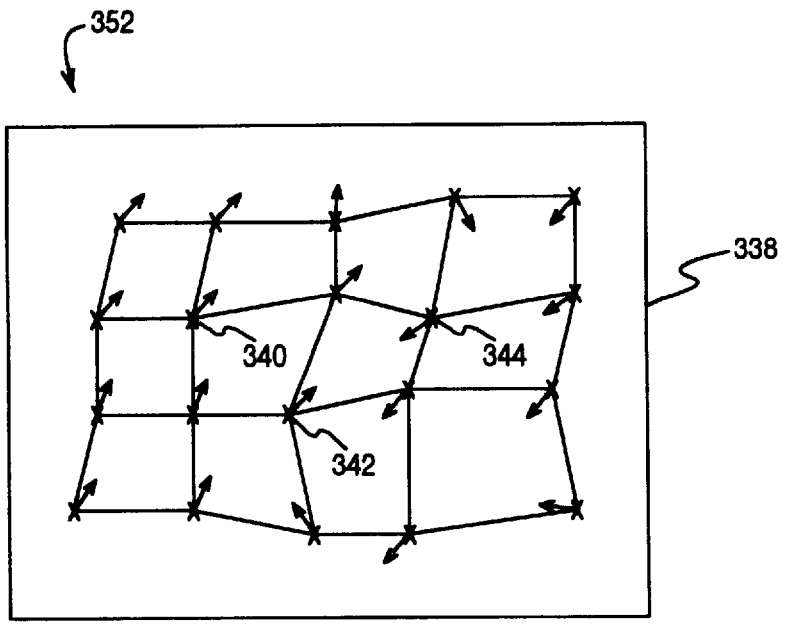
Figure 3C:
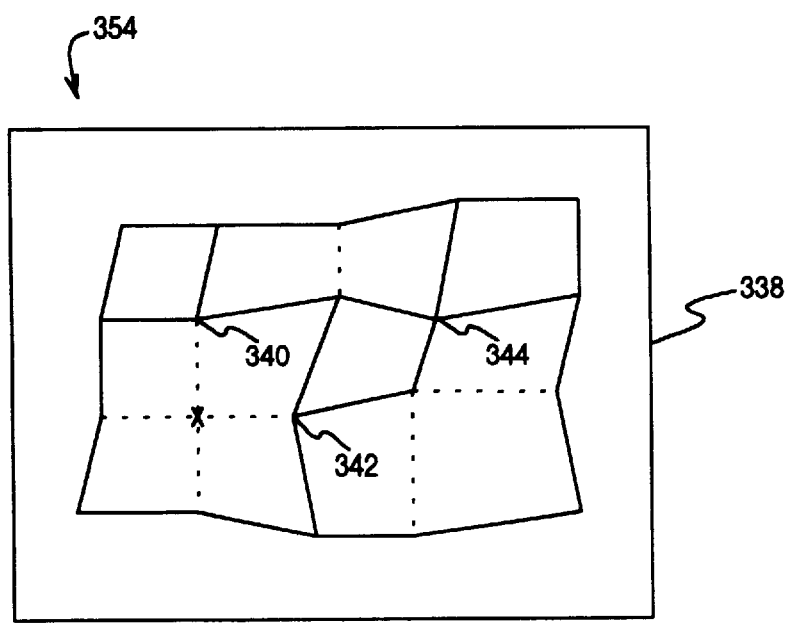

Now referring to FIGS. 3A–3C, which are diagrams illustrating another embodiment of distortion correction transformation stages that are performed automatically by an image generator under the direction of geometry transformation pipeline software, in accordance with the present invention. The software pipelines these distortion correction transformation stages in order to simplify support for different non-linear display surface geometries and projection systems. It is appreciated that the geometry transformation pipeline software of the present embodiment computes a non-linear image mapping for a previously rendered image in order to correctly presented the image to a viewer on a non-linear display surface geometry. Basically, the present embodiment performs ray casting from an image projector 318 in order to eventually compute texture coordinates (s, t) of the rendered image. In the end, the present embodiment performs an image mapping from texture coordinates (s, t) of the rendered image to a distortion function (x, y) of a non-linear display surface geometry. It is further appreciated that the present embodiment operates on computer system 100 in order to perform the distortion correction transformation stages automatically on-the-fly.

During transformation stage 302, a two dimensional projector image plane 304 is divided into a number of representative points (e.g., 306–310), thereby dividing it into a grid of points. It should be appreciated that the present embodiment is well adapted to divide two dimensional projector image plane 304 in a variety of ways. Once the representative points (e.g., 306–310) are chosen within two dimensional projector image plane 304, a vector (e.g., 312) is computed from each representative point (e.g., 306). In other words, an array of vectors (e.g., 312–316) are generated from the representative points (e.g., 306–310). It should be appreciated that the direction of the vectors (e.g., 312–316) is determined by the projector characteristics. It should be further appreciated that the present embodiment is well suited to be implemented with any type of projector lens (e.g., a fish-eye lens).

Referring still to FIG. 3A, during transformation stage 320, the vectors (e.g., 312–316) are then oriented through the orientation of image projector 318. During transformation stage 324, the oriented vectors (e.g., 312–316) of transformation stage 320 are then ray cast from the position of image projector 318 onto a parameterized spherical dome display surface 322. In this manner, three dimensional points (e.g., 326–330) are produced on parameterized spherical dome display surface 322. In other words, during transformation stage 324, the ray casting process is a determination of the intersection of each ray cast vector (e.g., 312) with parameterized spherical dome display surface 322. As such, the present embodiment resolves the equations of the ray cast vectors (e.g., 312–316) and parameterized spherical dome display surface 322, resulting in three dimensional points (e.g., 326–330) on the surface of parameterized spherical dome display surface 322. It should be appreciated that the present embodiment is well suited to operate with any parameterized non-linear display surface. Furthermore, it is appreciated that ray casting is well known by those of ordinary skill in the art.

Referring now to FIG. 3B, during transformation stage 232, the three dimensional points (e.g., 326–330) on parameterized spherical dome display surface 322 are transformed into eye space for this channel by transforming them through the orientation and position of a design eye point 334. During transformation stage 336, the present embodiment back projects the three dimensional points (e.g., 326–330) onto an image plane 338 of design eye point 334 in order to produce texture coordinate points (e.g., 340–344). Each texture coordinate (s, t) is then used with its corresponding two dimensional coordinate (x, y) determined during transformation stage 302 to map a computer generated image to the two dimensional projector image plane 304 of the projection system 218. Therefore, a non-linear image mapping is created in order to provide distortion correction for an image. It is appreciated that the process of back projecting during transformation stage 336 involves division by the "forward" or "z" vector 346 of design eye point 334 after transformation to eye space.

With reference now to FIG. 3C, during transformation stage 352, a two dimensional mapping of this image is then applied to compensate for any distortions or inaccuracies in the display system. In other words, the present embodiment performs an alignment process in order to fine tune the mesh of the non-linear image map. During transformation stage 354, a mesh complexity reduction is then applied by the present embodiment in order to limit the number of polygons needed for the remapping of the display. In other words, the present embodiment performs an optimization which drops vertices in order to simplify the mesh. It should be appreciated that if something within the mesh is linear or near linear, it can be approximated with fewer points than if it is highly non-linear. That is, if something is non-linear, a lot more vertices are used to approximate it compared to something which is linear. Once the non-linear image mapping is created by the present embodiment, it is then used by the image generator to manipulate images in order to correctly project them onto the actual physical spherical dome display surface. It should be appreciated that the present embodiment is able to dynamically adapt the non-linear image mapping to any changes in the shape of the parameterized display surface geometry, the position of the design eye point, and the position of the image projector. Therefore, if any of these parameters change, the present embodiment automatically re-performs the distortion correction transformation stages described above on-the-fly in order to determine a new non-linear image mapping.

It should be appreciated that an additional transformation stage could exist between transformation stages 302 and 320 which is similar to transformation stage 352. During the additional transformation stage, a two dimensional image warping operation is applied to make the final adjustment needed for final alignment to parameterized spherical dome display surface 322.

Figure 4:
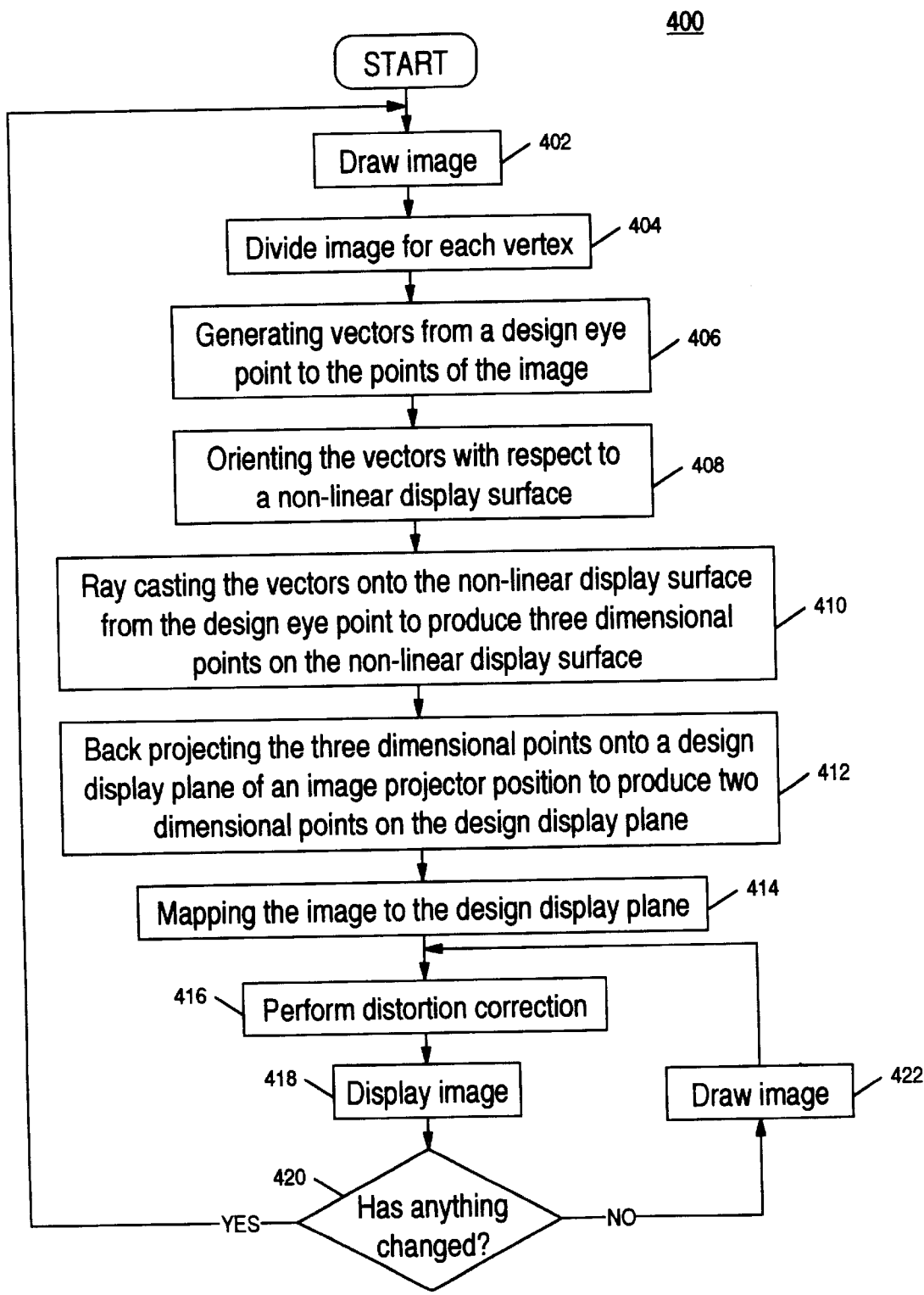
FIG. 4 is a flowchart, in accordance with one embodiment of the present invention, of an image generator automatically performing image distortion correction under the direction of geometry transformation pipeline software.

Referring now to FIG. 4, which is a flowchart 400, in accordance with one embodiment of the present invention, an image generator automatically performing image distortion correction based on a non-linear display surface, a design eye point, and an image projector position. Flowchart 400 includes processes of the present invention which, in one embodiment, are carried out by graphics hardware under the control of an application program. Although specific steps are disclosed in flowchart 400, such steps are exemplary. That is, the present invention is well suited to performing various other steps or variations of the steps recited in FIG. 4.

In step 402, within the present embodiment, an application program running on a host processor directs a rendering process of an image. That is, the application program provides the high-level instructions and data to be used during the image rendering process. In other words, an image is drawn during step 402. At step 404, a number of representative points or vertices are chosen by the program of the present embodiment within the rendered image, thereby dividing the rendered image into a grid of points. In other words, the program of the present embodiment divides the drawn image into a plurality of representative points by using each vertex of the drawn image during step 404. In step 406, the program of the present embodiment generates vectors from a design eye point to the chosen points of the drawn image. At step 408, the program of the present embodiment orients the vectors with respect to a non-linear display surface.

In step 410 of FIG. 4, the program of the present embodiment ray casts the vectors onto the non-linear display surface from the design eye point to produce three dimensional points on the non-linear display surface. At step 412, the program of the present embodiment back projects the three dimensional points onto a design display plane of the image projector position to produce two dimensional points on the design display plane. It should be appreciated that before the program of the present embodiment back projects the three dimensional points during step 412, it first transforms the three dimensional points into the projector space by transforming them through the image projector orientation and positional offset.

Within step 414 of FIG. 4, the program of the present embodiment maps the image to the design display plane. At step 416, the program of the present embodiment performs distortion correction on the drawn image. In step 418, the present embodiment displays the image on the non-linear display surface. As such, the image appears correct to a viewer. At step 420, the program of the present embodiment determines if the non-linear display surface, design eye point, or image projector position has changed. If one or more of these parameters has changed, the program of the present embodiment proceeds to step 402. If none of the above listed parameters has changed, the program of the present embodiment proceeds to step 422. In step 422, within the present embodiment, the application program running on the host processor directs the drawing of another image. It is appreciated that step 422 and step 402 of flowchart 400 are very similar. Upon completion of step 422, the present embodiment proceeds to step 416.

Thus, the present invention provides a method and system for automatically performing distortion correction to rendered images within an image generator in order to undo distortion induced by complex display systems (e.g., non-linear display surface geometry). Furthermore, the present invention provides a method and system which meets the above need and is inexpensive. Moreover, the present invention provides a method and system which meets the above need and provides a standard for distortion correction. Additionally, the present invention provides a method and system which meets the above need and is not limited to one non-linear display surface geometry. The present invention also provides a method and system which meets the above need and provides very accurate distortion correction.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method of automatically performing image distortion correction based on a non-linear display surface, a design eye point, and an image projector position, said method comprising the computer-implemented steps of:

rendering an image;

generating a vector from said design eye point to a point of said image;

orienting said vector with respect to said non-linear display surface;

ray casting said vector onto said non-linear display surface from said design eye point to produce a three dimensional point on said non-linear display surface;

back projecting said three dimensional point onto a display plane of said image projector position to produce a two dimensional point on said display plane; and mapping said image to said display plane.

2. A method as described in claim 1 further comprising the computer-implemented step of:

generating a texture coordinate which correlates to said point of said image.

3. A method as described in claim 2 wherein said step of mapping said image to said display plane further comprises the computer-implemented step of:

using said two dimensional point on said display plane and said texture coordinate to map said image to said display plane.

4. A method as described in claim 1 further comprising the computer-implemented step of:

compensating for misalignments of a mesh.

5. A method as described in claim 4 further comprising the computer-implemented step of:

reducing complexity of said mesh.

6. A method as described in claim 1 further comprising the computer-implemented step of:

reducing complexity of a mesh.

7. A method as described in claim 1 further comprising the computer-implemented step of:

performing an image warping operation to said vector.

8. A method of automatically performing image distortion correction based on a non-linear parameterized display surface, a design eye point, and an image projector position, said method comprising the computer-implemented steps of:

rendering an image;

generating vectors from said design eye point to a plurality of points of said image;

orienting said vectors with respect to said non-linear parameterized display surface;

ray casting said vectors onto said non-linear parameterized display surface to produce three dimensional points on said non-linear parameterized display surface;

back projecting said three dimensional points onto a design display plane of said image projector position to produce two dimensional points on said design display plane; and mapping said image to said design display plane to create a mesh.

9. A method as described in claim 8 further comprising the computer-implemented step of:

generating texture coordinates which correlate to said vectors.

10. A method as described in claim 9 wherein said step of mapping said image to said design display plane to create a mesh further comprises the computer-implemented step of:

using said two dimensional points on said design display plane and said texture coordinates to map said image to said design display plane.

11. A method as described in claim 8 further comprising the computer-implemented step of:

compensating for misalignments of said mesh.

12. A method as described in claim 11 further comprising the computer-implemented step of:

reducing complexity of said mesh.

13. A method as described in claim 8 further comprising the computer-implemented step of:

reducing complexity of said mesh.

14. A method as described in claim 8 further comprising the computer-implemented step of:

performing an image warping operation to said vectors.

15. A method of automatically performing image distortion correction based on a non-linear display surface, a design eye point, and an image projector position, said method comprising the computer-implemented steps of:

rendering an image;

generating a vector from a point of an image projector space;

orienting said vector with the orientation of an image projector;

ray casting said vector onto said non-linear display surface from an image projector position to produce a three dimensional point on said non-linear display surface;

back projecting said three dimensional point onto an image plane of a design eye point to produce a two dimensional point; and mapping said image to a display plane.

16. A method as described in claim 15 further comprising the computer-implemented step of:

generating a texture coordinate which correlates to said point.

17. A method as described in claim 16 wherein said step of mapping said image to said display plane further comprises the computer-implemented step of:

using said point and said texture coordinate to map said image to said display plane.

18. A method as described in claim 15 further comprising the computer-implemented step of:

compensating for misalignments of a mesh.

19. A method as described in claim 18 further comprising the computer-implemented step of:

reducing complexity of said mesh.

20. A method as described in claim 15 further comprising the computer-implemented step of:

reducing complexity of a mesh.

21. A method as described in claim 15 wherein said two dimensional point comprises a texture coordinate.

* * * * *